Oct. 16, 1956     I. R. BYRON     2,767,036
SHIFT BEARING FOR VARIABLE PITCH PROPELLER DRIVE
Filed July 7, 1952     2 Sheets-Sheet 1
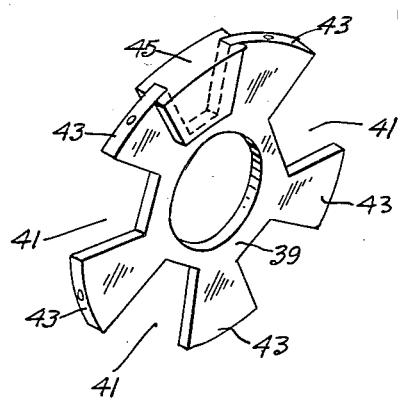
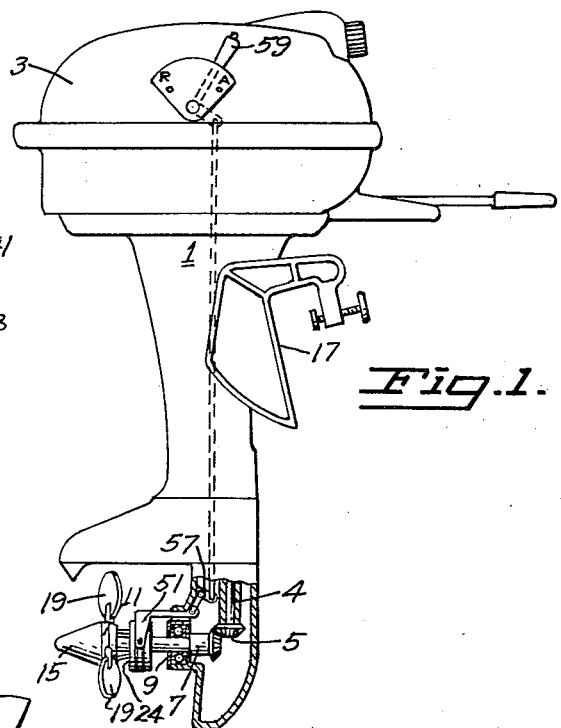
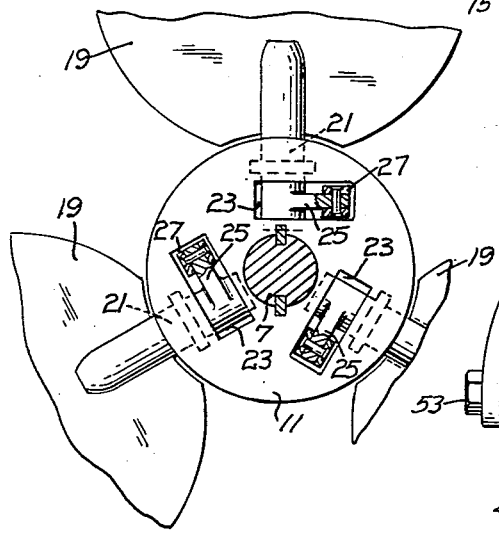
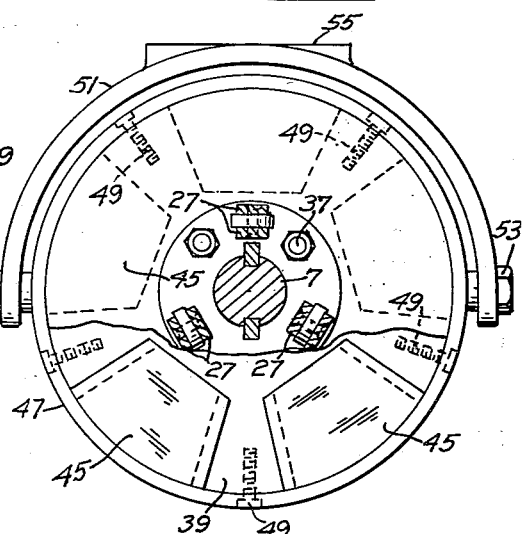
INVENTOR.
IRVING R. BYRON
BY
Bruce & Brosler
HIS ATTORNEYS

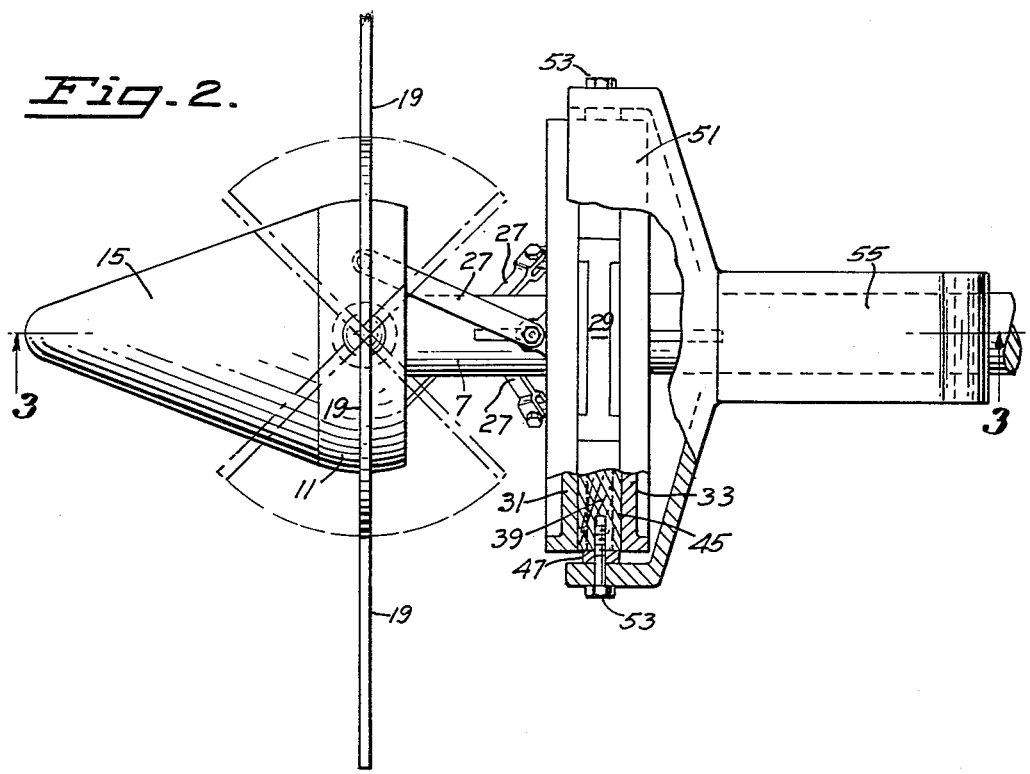
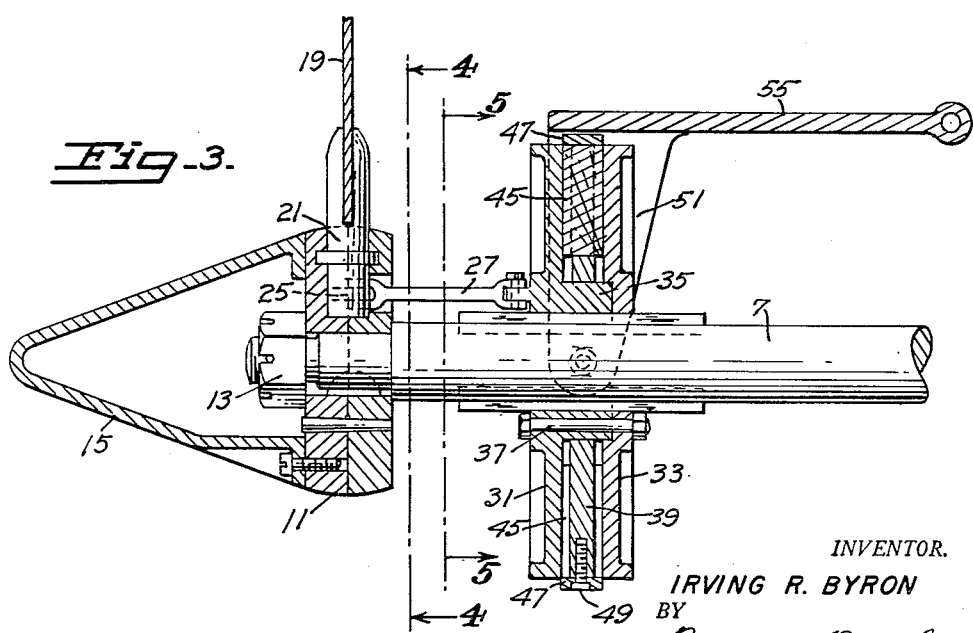

United States Patent Office 2,767,036
Patented Oct. 16, 1956

2,767,036
SHIFT BEARING FOR VARIABLE PITCH PROPELLER DRIVE

Irving R. Byron, Albany, Calif.

Application July 7, 1952, Serial No. 297,554

4 Claims. (Cl. 308—135)

My invention relates to variable pitch propeller drives and more particularly to a shift bearing for such type of drive.

Among the objects of the present invention are:

(1) To provide a novel and improved shift bearing for a variable pitch propeller drive;

(2) To provide a novel and improved shift bearing for a variable pitch propeller drive which shall be durable and capable of withstanding heavy loads and stresses;

(3) To provide a novel and improved shift bearing for a variable pitch propeller drive, which shall be relatively economical to fabricate and service.

Additional objects of my invention will be brought out in the following description of a preferred embodiment of the same taken in conjunction with the accompanying drawings wherein—

Figure 1 is a view in elevation of the invention as embodied in an outboard motor assembly;

Figure 2 is a plan view, partly in section, of the pertinent portion of the outboard motor assembly of Figure 1;

Figure 3 is an elevational view in section taken in the plane 3—3 of Figure 2;

Figure 4 is a view in section taken in the plane 4—4 of Figure 3;

Figure 5 is a view in section taken in the plane 5—5 of Figure 3;

Figure 6 is a three dimensional view showing the construction of a thrust bearing to which the present invention relates.

Referring to the drawings for details of my invention in its preferred form, I have illustrated the same as being embodied in an outboard motor 1 involving a casing 3 which houses a gas engine (not shown), provided with a downwardly extending drive shaft 4. This drive shaft is coupled through a set of bevel gears 5 to a horizontal propeller shaft 7, which is suitably supported in bearings 9 in the lower end of the casing.

The propeller shaft terminates at its outer end in a propeller hub 11 which is bolted on to the end of the propeller shaft with a nut 13. An end cap 15 bolted to the hub, encloses the nut and serves to streamline the hub.

A clamp bracket 17, affixed to the casing at an intermediate position thereon, provides for attachment of the outboard motor to the rear end of a row boat or the like in the conventional manner.

Radially mounted in the hub are a plurality of propeller blades 19, the stem 21 of each of which is journaled in the hub and intersects an aperture 23 normal thereto through the hub, in which aperture the stem is provided with a shift lever 25 for angularly rotating the associated blade.

Each such lever is connected by a link 27 to a bearing 29, the structural features of which lie at the heart of the present invention.

Such shift bearing involves a pair of face plates 31 and 33, slidably keyed to the propeller shaft for rotation therewith. These face plates are normally spaced apart by an integral hub flange 35 on one plate extending along the propeller shaft and engaging the other, to which hub flange, the other face plate is affixed into a unitary assembly with the first plate by suitable bolts 37.

Between such face plates and prior to assembling the same, there is interposed a circular thrust plate 39 having a plurality of radial notches 41 in the periphery thereof, such radial notches creating a thrust plate having a plurality of radially directed arms 43.

In each such peripheral notch is inserted a thrust or bearing block 45 of greater thickness than the thrust plate. Each such bearing block has its side edges 46 grooved to interlock with the adjacent edges of the adjacent arms, and at its outer edge, the block is contoured to the curvature of the radial arms to blend in with the circular contour of the thrust plate. It is removably held in such assembled position by a band 47 which encircles the thrust plate and is bolted thereto by spaced bolts 49 threaded into the ends of the arms.

Inasmuch as the shift bearing functions under water, the bearing blocks are preferably of material which has the necessary bearing characteristics for such use, and among such materials may be noted lignum vita, phenolic resin compositions, rubber or nylon.

The thrust plate is straddled by a shift fork or yoke 51 in the plane of the thrust plate, such fork being connected to the thrust plate at substantially diametrically opposite points on the plate by suitable bolts 53.

The aforementioned shift fork includes a handle 55 which slidably passes into the casing, where it is coupled by suitable linkage 57 to a quadrant handle 59 mounted on the casing within convenient reach of an operator. The thrust plate is thus held against rotation without impairing the ability of the face plates to rotate with the propeller shaft. Any shifting of the fork, will accordingly cause a corresponding shift in the pitch of the propeller blades.

The thrust bearing described above, is of utmost simplicity and can be made quite rugged and capable of standing heavy loads and stresses which are normally encountered in equipment of this type, and particularly when reversing the pitch of the propeller while the craft is in motion. By reason of the simplicity of the structure, the bearing blocks may be readily replaced when worn and at relatively little cost.

While I have disclosed my invention in its preferred form, the same is subject to alteration and modification without departing from the underlying principles involved, and accordingly, while I have disclosed the same in considerable detail, I do not desire to be limited in my protection to such details except as may be necessitated by the appended claims.

I claim:

1. A shift bearing for a variable pitch propeller drive, comprising a pair of face plates; means holding said face plates in spaced relationship to each other; a thrust plate intermediate said face plates, said thrust plate having a plurality of spaced radial notches in the periphery thereof, for the radial insertion of bearing blocks and forming a plurality of freely extending radial arms; a bearing block of greater thickness than said thrust plate in each of said notches and protruding beyond each face of said thrust plate; and means removably securing said bearing blocks in said thrust plate against withdrawal therefrom in a radial direction, said means including a band disposed peripherally about said plate and affixed thereto.

2. A shift bearing for a variable pitch propeller drive, comprising a pair of face plates, one of said face plates having a hub flange to which the other is removably affixed in spaced relationship to the first plate; a thrust plate intermediate said face plates, said thrust plate having a plurality of equally spaced radial notches in the periphery thereof, for the radial insertion of bearing blocks and forming a plurality of freely extending radial arms; a bearing block of greater thickness than said thrust plate, in each of said notches and having grooved edges interlocking with the adjacent edges of adjacent arms of said thrust plate; and means removably securing said bearing blocks in said thrust plate against withdrawal therefrom in a radial direction, said means including a band disposed peripherally about said plate and affixed thereto.

3. Means for inclusion in a variable pitch propeller drive shift bearing for use in the shifting of such bearing, said means including a thrust plate having a plurality of radial notches in the periphery thereof, for the radial insertion of bearing blocks and forming a plurality of freely extending radial arms, a bearing block of greater thickness than said thrust plate in each of said notches and protruding beyond each face of said plate, and means for securing said bearing blocks in said thrust plate against withdrawal therefrom in a radial direction.

4. Means for inclusion in a variable pitch propeller drive shift bearing for use in the shifting of such bearing, said means including a thrust plate having a plurality of radial notches in the periphery thereof, for the radial insertion of bearing blocks and forming a plurality of freely extending radial arms, a bearing block of greater thickness than said thrust plate, in each of said notches and having grooved edges interlocking with the adjacent edges of adjacent arms of said thrust plate, said grooves being located to cause said blocks to protrude beyond each face of said thrust plate, and means removably securing said bearing blocks in said thrust plate against withdrawal therefrom in a radial direction, said means involving a band disposed peripherally about said thrust plate and affixed thereto.

References Cited in the file of this patent

UNITED STATES PATENTS

| | | |
|---|---|---|
| 897,330 | Westbrook | Sept. 1, 1908 |
| 1,055,455 | Esson | Mar. 11, 1913 |
| 1,407,272 | Harkins | Feb. 21, 1922 |
| 1,415,756 | Zook | May 9, 1922 |
| 1,791,198 | Focher | Feb. 3, 1931 |
| 1,913,802 | Gregory | June 13, 1933 |
| 1,917,610 | Smith | July 11, 1933 |
| 1,937,112 | Gamble | Nov. 28, 1933 |
| 2,253,316 | Armitage | Aug. 19, 1941 |
| 2,341,207 | Carol | Feb. 8, 1944 |
| 2,516,966 | Du Bois | Aug. 1, 1950 |
| 2,525,648 | Butler | Oct. 10, 1950 |

FOREIGN PATENTS

| | | |
|---|---|---|
| 20,079 | Great Britain | A. D. 1901 |